(12) United States Patent
Winterling

(10) Patent No.: US 7,017,629 B2
(45) Date of Patent: Mar. 28, 2006

(54) WINDSHIELD WIPER FLUID RESERVOIR

(75) Inventor: Stefan Winterling, Hof (DE)

(73) Assignee: Rehau AG & Co., Rehau (DE)

( * ) Notice: Subject to any disclaimer, the term of this patent is extended or adjusted under 35 U.S.C. 154(b) by 0 days.

(21) Appl. No.: 10/495,135

(22) PCT Filed: Oct. 30, 2002

(86) PCT No.: PCT/EP02/12090

§ 371 (c)(1),
(2), (4) Date: May 10, 2004

(87) PCT Pub. No.: WO03/039923

PCT Pub. Date: May 15, 2003

(65) Prior Publication Data

US 2005/0016619 A1   Jan. 27, 2005

(30) Foreign Application Priority Data

Nov. 9, 2001 (DE) ............................ 201 18 271 U

(51) Int. Cl.
*B65B 39/00* (2006.01)

(52) U.S. Cl. ................... 141/327; 141/326; 141/338; 220/746

(58) Field of Classification Search ............ 15/250.01; 220/86.2, 745–746; 137/587–589; 141/327, 141/331–345, 326, 325, 59

See application file for complete search history.

(56) References Cited

U.S. PATENT DOCUMENTS

| 3,187,936 A | | 6/1965 | Downing |
| 5,327,946 A | * | 7/1994 | Perkins .................... 141/59 |
| 6,044,517 A | * | 4/2000 | Zendler et al. .......... 15/250.01 |
| 6,223,793 B1 | * | 5/2001 | Donoughe et al. ........ 141/338 |

FOREIGN PATENT DOCUMENTS

| DE | 35 27 700 A1 | 2/1987 |
| DE | 196 37 925 | 3/1997 |
| EP | 0 360 100 | 3/1990 |
| GB | 2 065 580 | 7/1981 |
| GB | 2 290 461 | 1/1996 |
| WO | WO 96/40544 A1 | 12/1996 |

* cited by examiner

*Primary Examiner*—Timothy L. Maust
(74) *Attorney, Agent, or Firm*—Venable LLP; Robert Kinberg; Steven Schwarz

(57) ABSTRACT

The invention relates to a windshield wiper fluid reservoir (1) comprising a closure device (4) and a filling tube (2) for use in a windshield wiper system for motor vehicles. The aim of the invention is to improve the design of a prior art windshield wiper fluid reservoir (1) comprising a closure device (4) and a filling tube (2) whereby improving the ability to fill the reservoir, in particular, enabling a pressure filling involving the use of a pump nozzle. This is achieved by provision of a filling tube (2), which comprises an integrated ventilation channel (3) in a one-piece design and is situated on the windshield wiper fluid reservoir (1). ventilation channel (3) is shaped by reshaping the upper area of the filling tube. This ensues by pressing in the lateral surfaces (6) in the upper third of the filling tube (2) in a longitudinal direction.

5 Claims, 2 Drawing Sheets

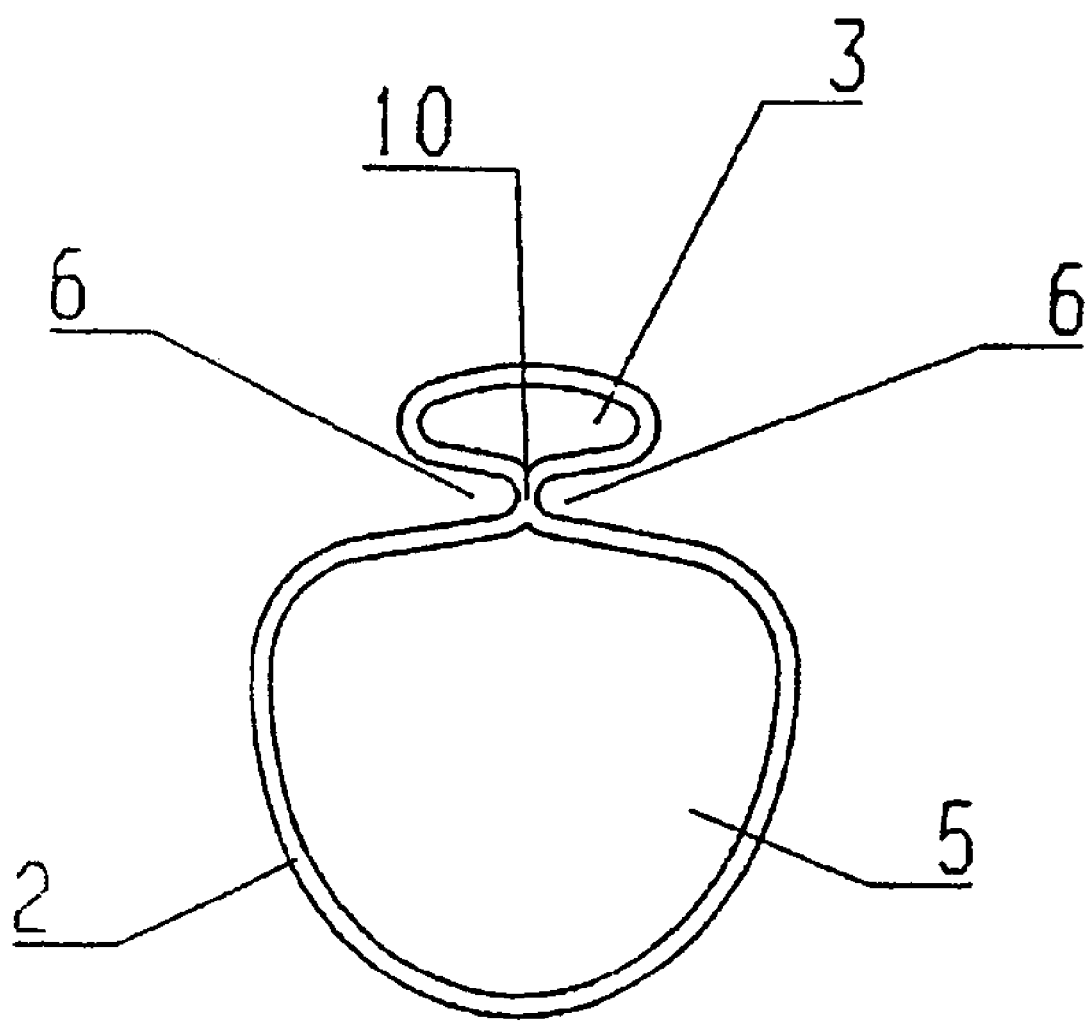

WINDSHIELD WIPER FLUID RESERVOIR

Figure 1:
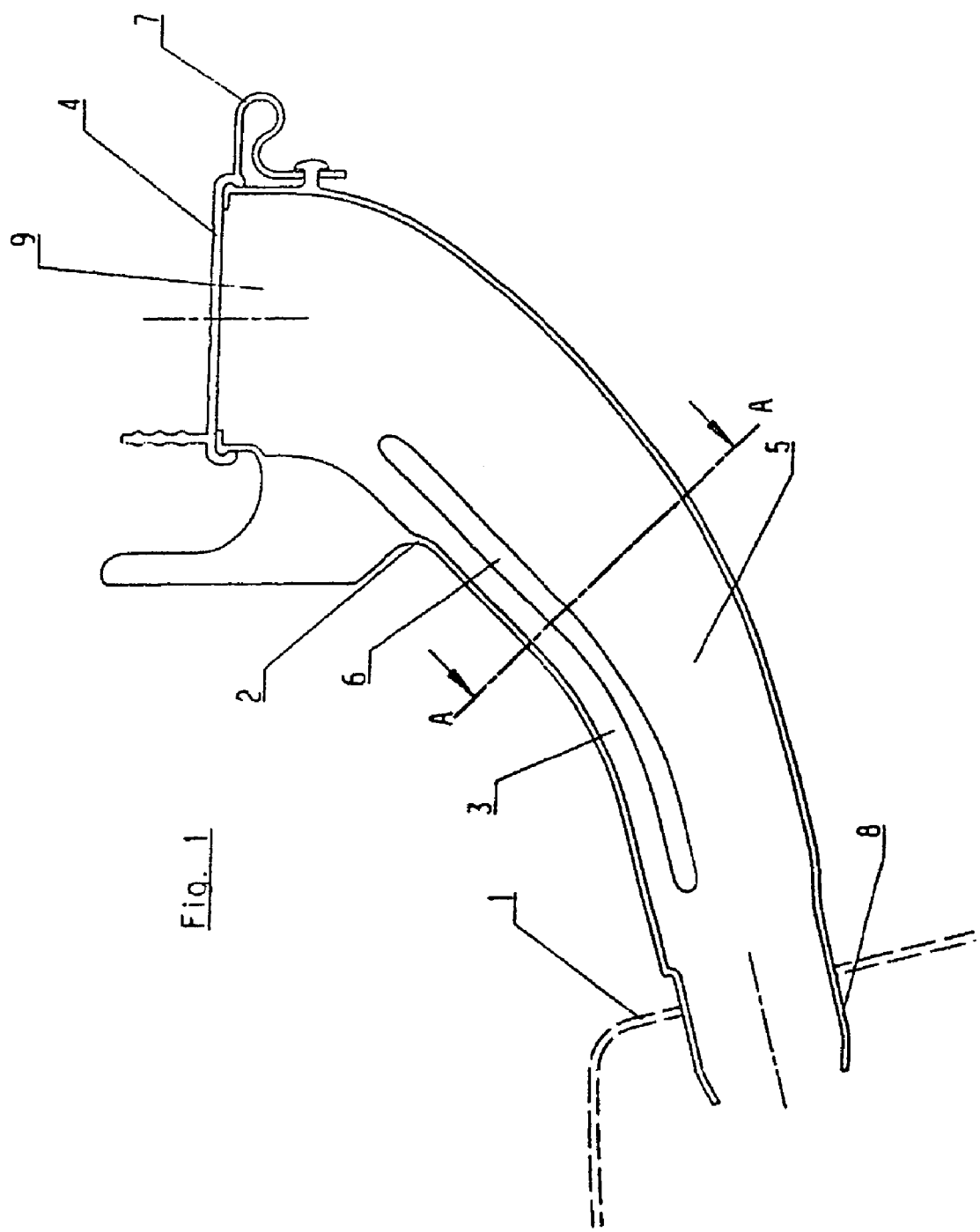

The invention relates to a windshield wiper fluid reservoir comprising a closure device and a filling tube for use in a windshield wiper system for motor vehicles.

Windshield wiper fluid reservoirs comprising a closure device and a filling tube are generally known.

Present-day motor vehicles are provided with windshield wiper systems comprising a reservoir for holding the windshield wiper fluid to which cleaning fluid or anti-freezing compound is added, if necessary Windshield wiper fluid reservoirs of this type are normally arranged in the engine compartment of a motor vehicle. The filling tube is provided with a snap-in plastic lid. Windshield wiper fluid reservoirs arranged in the motor vehicle engine compartment for the most part are provided with a relatively large filling opening, so that sufficient space is available during the filling to allow the air inside the reservoir to escape without problem.

Present-day motor vehicles comprise a plurality of units which must be installed in the engine compartment in addition to the actual engine. The engines furthermore are also encapsulated to achieve a certain insulating effect during the operation. As a result, the engine compartment is therefore in general almost completely filled up.

Since motor vehicles nowadays are provided with systems for cleaning the rear windshield and the headlights in addition to the front windshield cleaning system, the windshield wiper fluid reservoirs must hold larger amounts of washer fluid.

For example, a windshield wiper fluid reservoir normally holds 1.5 to 3 liters if only one windshield wiper system is provided.

However, if this reservoir must also supply the washer fluid for the headlights, the content increases to 5 to 7 liters.

Given the tight space conditions of the engine compartment, it is not always possible to enlarge the windshield wiper fluid reservoir.

Windshield wiper fluid reservoirs of this type are therefore frequently accommodated in cavities in the car body, for example in the engine hood, the roof region, or the trunk lid. Windshield wiper fluid reservoirs of this type furthermore can also be accommodated in the fender region.

Reference DE 41 23 947 A1 discloses a liquid reservoir for a motor vehicle which is arranged in the cavity of the car body. The fluid reservoir can be arranged on the engine hood and/or the roof surfaces that face the vehicle inside, wherein the shape of the respective fluid reservoir is adapted to the respective space conditions. If the fluid reservoir is arranged on the engine hood and/or on the trunk lid, the fluid reservoir is provided with a fold-out filling funnel. The filling opening of the fluid reservoir is closed off with a screw-on lid or the like to prevent the fluid from running out.

The filling tubes and/or funnels have a relatively narrow design owing to the tight space conditions. Thus, air trapped inside the reservoir cannot always escape without problem during the filling of the reservoir with washer fluid.

To effect a corresponding equalization of pressure during the filling of the windshield wiper fluid reservoir, it has been proposed in the past to insert a hose into the filling tube, to provide a ventilation valve on the reservoir, or to fit a hose onto the reservoir.

However, inserting or fitting-on a hose has the disadvantage of requiring a high design expenditure for producing the hose receptacle as well as a corresponding guide for the hose. Ventilation valves consist of several parts and their function can be impaired by dirt.

It is therefore the object of the present invention to modify a known windshield wiper fluid reservoir with a closure device and a filling tube in such a way that the filling options are improved, in particular to permit a pressure filling with a nozzle.

This object is solved according to the invention by designing the filling tube, arranged on the windshield wiper fluid reservoir, such that it forms one-piece together with integrated ventilation channel.

The ventilation channel is formed through reshaping of the upper region of the filling tube by pushing in the side areas in the upper third of the filling tube, as seen in longitudinal direction. The opening of the ventilation channel ends below the filling opening of the filling tube and can also be closed off at the same time as the filling tube with the lid for the filling tube. The upper side surfaces of the filling tube are pushed in over a specified length, wherein the shape of the filling opening and the connecting tube to the windshield wiper fluid reservoir is retained. A windshield wiper fluid reservoir with filling tube is designed and/or produced in this way, which is provided with a ventilation channel without requiring additional structural parts or components.

The invention is to be explained in further detail with the aid of an exemplary embodiment which shows in:

FIG. 1A longitudinal section through the filling tube

FIG. 2A section along the line A—A.

FIG. 1 shows a longitudinal section through the filling tube 2 of a windshield wiper fluid reservoir 1. The windshield wiper fluid reservoir 1 is only indicated in this Figure. The filling tube 2 is connected via the tube 8 to the windshield wiper fluid reservoir 1. The filling opening 9 is closed off with a lid 4 that can be rigged to stay open. The lid 4 is connected via the lid holder 7 to the filling tube 2.

The filling tube 2 is divided into a ventilation channel 3 and a filling channel 5. The ventilation channel 3 is formed by pushing the side surfaces 6 toward the inside in the upper third of the filling tube, such that the front surfaces 10 make contact approximately in the center.

As a result, the filling tube 2, designed as blow-molded part, is pushed toward the inside with a corresponding tool that acts upon the side surfaces 6 in the upper third. The ventilation channel 3 ends just below the filling opening 9, so that this channel can be closed off at the same time by the lid 4.

FIG. 2 shows a sectional view along the line A—A through the filling tube 2. The sectional representation shows that the ventilation channel 3 and the filling channel 5 as one piece form the complete filling tube 2.

The side surfaces 6 are pushed in on both sides in the upper third of the filling tube. The front surfaces 10 make contact approximately in the center and consequently form a ventilation channel as well as a filling channel.

For the filling of the windshield wiper fluid reservoir 1, the filling nozzle is inserted into the large opening of the filling tube 2. The windshield wiper fluid then runs via the filling channel 5 into the windshield wiper fluid reservoir 1. During the pressure filling, the displaced air can escape through the smaller ventilation channel 3 from the reservoir.

REFERENCE NUMBERS

1—windshield wiper fluid reservoir
2—filling tube
3—ventilation channel
4—lid
5—filling channel
6—side surfaces
7—lid holder
8—tube
9—filling opening
10—front surface

What is claimed is:

1. A windshield wiper fluid reservoir, comprising:
a fluid reservoir;
a filling tube having a first filling tube end that is open and adapted to receive fluid, and a second filling tube end that is connected to the fluid reservoir;
a closure device located on the first filling tube end; and
a ventilation channel located within the filling tube, the ventilation channel having a first ventilation channel end spaced apart from the first filling tube end in the direction of the second filling tube end, and a second ventilation channel end spaced apart from the first ventilation channel end in the direction of the second filling tube end.

2. The windshield wiper fluid reservoir of claim 1, wherein the ventilation channel is defined by a pair of opposed indentations that are formed in the filling tube and extend along a portion of the filling tube.

3. The windshield wiper fluid reservoir of claim 2, wherein the pair of opposed indentations are approximately one third as long as the filling tube.

4. The windshield wiper fluid reservoir of claim 1, wherein the closure device simultaneously closes the filling tube and the ventilation channel.

5. The windshield wiper fluid reservoir of claim 1, wherein the filling tube has a substantially round cross-section at the filling tube first end and at the filling tube second end, and the filling tube has a substantially figure-eight shaped cross-section along the ventilation channel.

* * * * *